Figure 1:
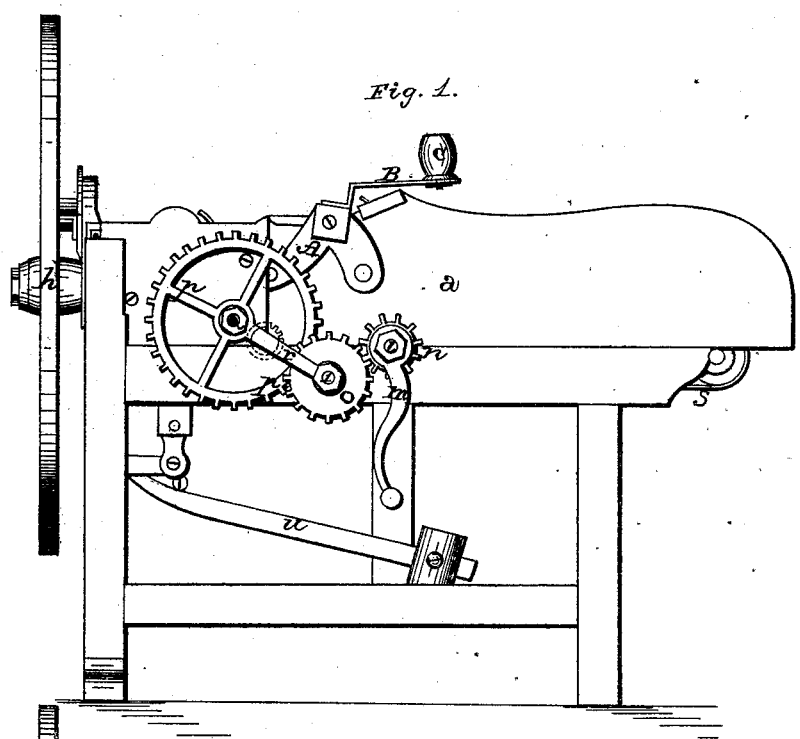
Figure 2:
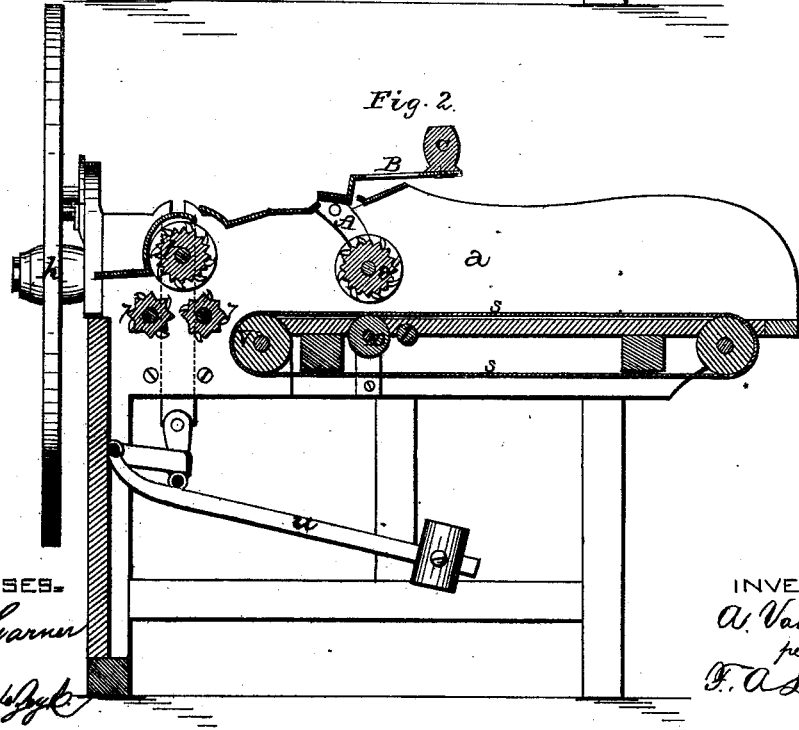
Figure 3:
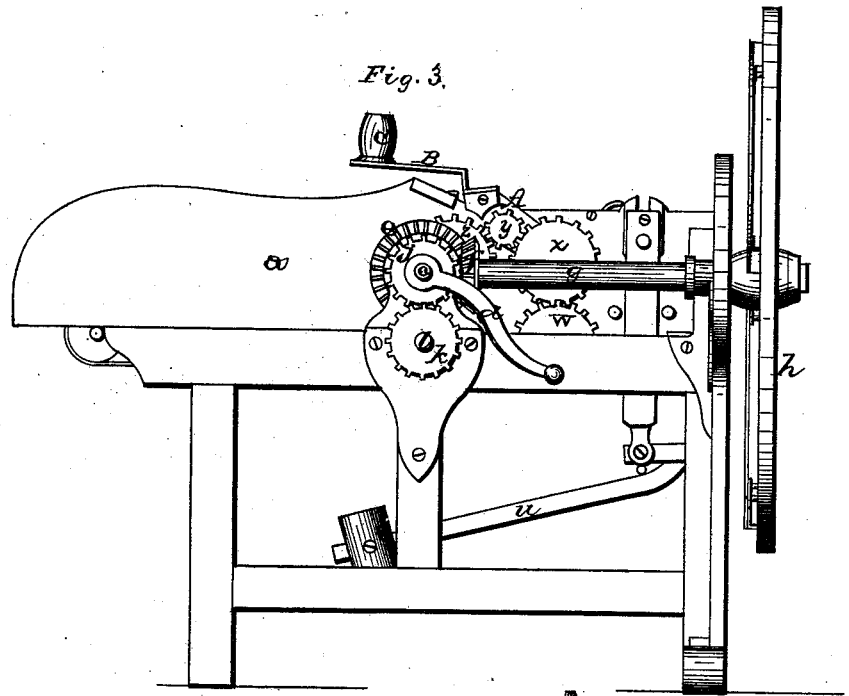
Figure 4:
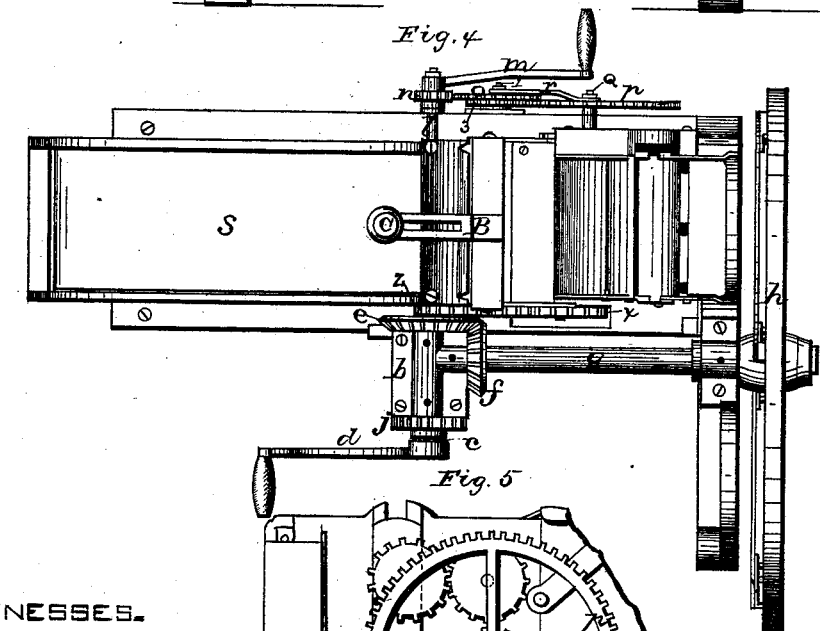
Figure 5:
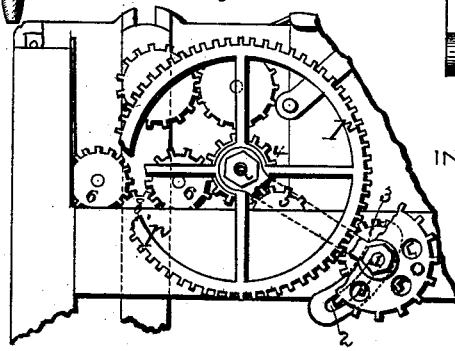

A. VAHLDIECK.
STRAW-CUTTER.

No. 191,625. Patented June 5, 1877.

2 Sheets—Sheet 1.

WITNESSES:
J. Wm Garner
Albert J. de Zyl

INVENTOR:
A. Vahldieck
per
F. A. Lehmann,
atty

A. VAHLDIECK.
STRAW-CUTTER.

No. 191,625.  Patented June 5, 1877.

WITNESSES.  INVENTOR.

UNITED STATES PATENT OFFICE.

ANDREAS VAHLDIECK, OF JOHNSONVILLE, WISCONSIN.

IMPROVEMENT IN STRAW-CUTTERS.

Specification forming part of Letters Patent No. 191,625, dated June 5, 1877; application filed March 30, 1877.

*To all whom it may concern:*

Be it known that I, A. VAHLDIECK, of Johnsonville, in the county of Sheboygan and State of Wisconsin, have invented certain new and useful Improvements in Straw-Cutters; and I do hereby declare the following to be a full, clear, and exact description of the invention, such as will enable others skilled in the art to which it pertains to make and use it, reference being had to the accompanying drawings, which form part of this specification.

My invention relates to an improvement in hay and straw cutters; and it consists in the arrangement and combination of devices, that will be more fully described hereinafter, whereby a powerful and effective cutter, that is adapted to all kinds of work, is produced.

The accompanying drawings represent my invention.

$a$ represents the frame-work, which may be of any desired form, shape, or construction. Journaled in a suitable bearing, $b$, on one side, is a short shaft, $c$, on one end of which is the handle $d$, and on the other the beveled cog-wheel $e$, which meshes with the cog-wheel $f$ on the rear end of the shaft $g$, which shaft imparts motion to the large cutting-wheel $h$ on the front end of the machine. On the shaft $c$, just inside of the handle $d$, is a cog-wheel, $j$, which meshes with a similar one, $k$, placed on the end of a shaft, $l$, which runs through under the machine, and has the handle $m$ at right angles to the one $d$ secured to its opposite end. On this shaft $l$, inside of the handle $m$, is a pinion, $n$, which meshes with the wheel $o$, which is placed on a short headed journal, 1, that is moved back and forth in the circular slot 2 for the purpose of throwing the pinion 3, that is also placed upon it, in and out of gear with the large wheel $p$. On the same shaft $q$ as the wheel $p$ is fastened one end of the plate $r$, which has its rear end fastened to the headed bolt or journal 1, so as to keep the two parts 1 and $q$ uniformly distant from each other. Secured to the shaft $q$ inside of the casing is a gear-wheel, 4, which operates the wheel 5 on the end of the roller that moves the endless belt $s$, so that any hay or straw that is placed in the box will be carried forward to be cut without any further care from the operator. Meshing with the wheel 4 is another wheel, 6, on the end of one of the lower feed-rollers 7. There are two of these rollers placed about on a level with the bottom of the box, and which are made to revolve in the same direction by means of a small idle-wheel, 8, placed between the gears 6, on their ends. Bearing down upon the middle of these two wheels is a large feed-roller, $t$, which is made to move vertically by a suitable mechanism, so as to adapt itself to the thickness of the hay or straw being cut. All three of these rollers are provided with suitable projections, so as to catch in the hay and feed it constantly forward, and by having three of the rollers placed in the relation here shown the material is fed forward with an evenness and regularity that cannot be produced by any of the devices now in use. The pressure of the top roller is regulated by the weighted lever $u$.

Secured to the opposite end of the roller V from the wheel 5 is a spur-wheel, W, which meshes with a similar wheel, $x$, which in turn operates a pinion, $y$, and this pinion in turn operates a spur-wheel, Z, on the end of a feed-roller, 9. This feed-roller is journaled in the pivoted frame A that is provided with the slotted arm B, in which the handle C can be adjusted back and forth. By means of this handle C the roller can be raised upward to allow the material to pass under it, and any desired amount of pressure can be exerted upon the material in order to make the endless belt $s$ catch hold of it. Extending across the bottom of the box under this roller 9 is another roller, D, which assists in moving the apron forward, and prevents it from being pressed down upon the floor of the box by the pressure from above.

By taking off the crank and pinion on the left side of the machine, and putting a larger wheel in place of the pinion, the feed may be made to move more rapidly, and hence be cut longer. The smaller the pinion the shorter the feed is cut, and vice versa. For the purpose of making these changes the headed journal 1 is also made to move back and forth in the circular slot 2.

Having thus described my invention, I claim—

1. In a feed-cutter, the pressure-roller 9, located near the center of the feed-box and made adjustable up and down, as set forth.

2. The combination of an endless belt or apron, s, and an adjustable feed-roller, 9, located near the center of the feed-box, substantially as shown.

3. The combination of the roller 9, located near the center of the feed-box, pivoted frame A, arm B, handle C, and an endless belt, s, substantially as described.

In testimony that I claim the foregoing I have hereunto set my hand this 17th day of March, 1877.

ANDREAS VAHLDIECK.

Witnesses:
    CHARLES FÜCHS,
    HENRY KLEMME.